(12) United States Patent
Carmel et al.

(10) Patent No.: US 6,389,473 B1
(45) Date of Patent: May 14, 2002

(54) NETWORK MEDIA STREAMING

(75) Inventors: Sharon Carmel; Tzur Daboosh, both of Giv'atayim; Eli Reifman, Rishon le Zion; Naftali Shani; Ziv Eliraz, both of Tel Aviv; Dror Ginsberg, Karkur; Edan Ayal, Kfar Saba, all of (IL)

(73) Assignee: Geo Interactive Media Group Ltd., Givatayim (IL)

( * ) Notice: Subject to any disclaimer, the term of this patent is extended or adjusted under 35 U.S.C. 154(b) by 0 days.

(21) Appl. No.: 09/275,703

(22) Filed: Mar. 24, 1999

(30) Foreign Application Priority Data

Mar. 24, 1998 (IL) ................................................ 123819

(51) Int. Cl.⁷ .............................................. G06F 13/00
(52) U.S. Cl. .................................................... 709/231
(58) Field of Search ...................... 707/500.1; 709/200, 709/231, 236, 246, 247; 382/236, 239; 375/240.12

(56) References Cited

U.S. PATENT DOCUMENTS 5,267,334 A   11/1993  Normille et al. ............ 382/236
5,404,446 A   4/1995   Bowater et al. ............. 345/537
5,841,432 A   11/1998  Carmel et al. ........... 707/500.1

Primary Examiner—Robert B. Harrell
(74) Attorney, Agent, or Firm—Ladas & Parry

(57) ABSTRACT

A method for real-time broadcasting from a transmitting computer to one or more client computers over a network, including providing at the transmitting computer a data stream having a given data rate, and dividing the stream into a sequence of slices, each slice having a predetermined data size associated therewith. The slices are encoded in a corresponding sequence of files, each file having a respective index, and the sequence is uploaded to a server at an upload rate generally equal to the data rate of the stream, such that the one or more client computers can download the sequence over the network from the server at a download rate generally equal to the data rate.

41 Claims, 11 Drawing Sheets

Microfiche Appendix Included
(2 Microfiche, 138 Pages)

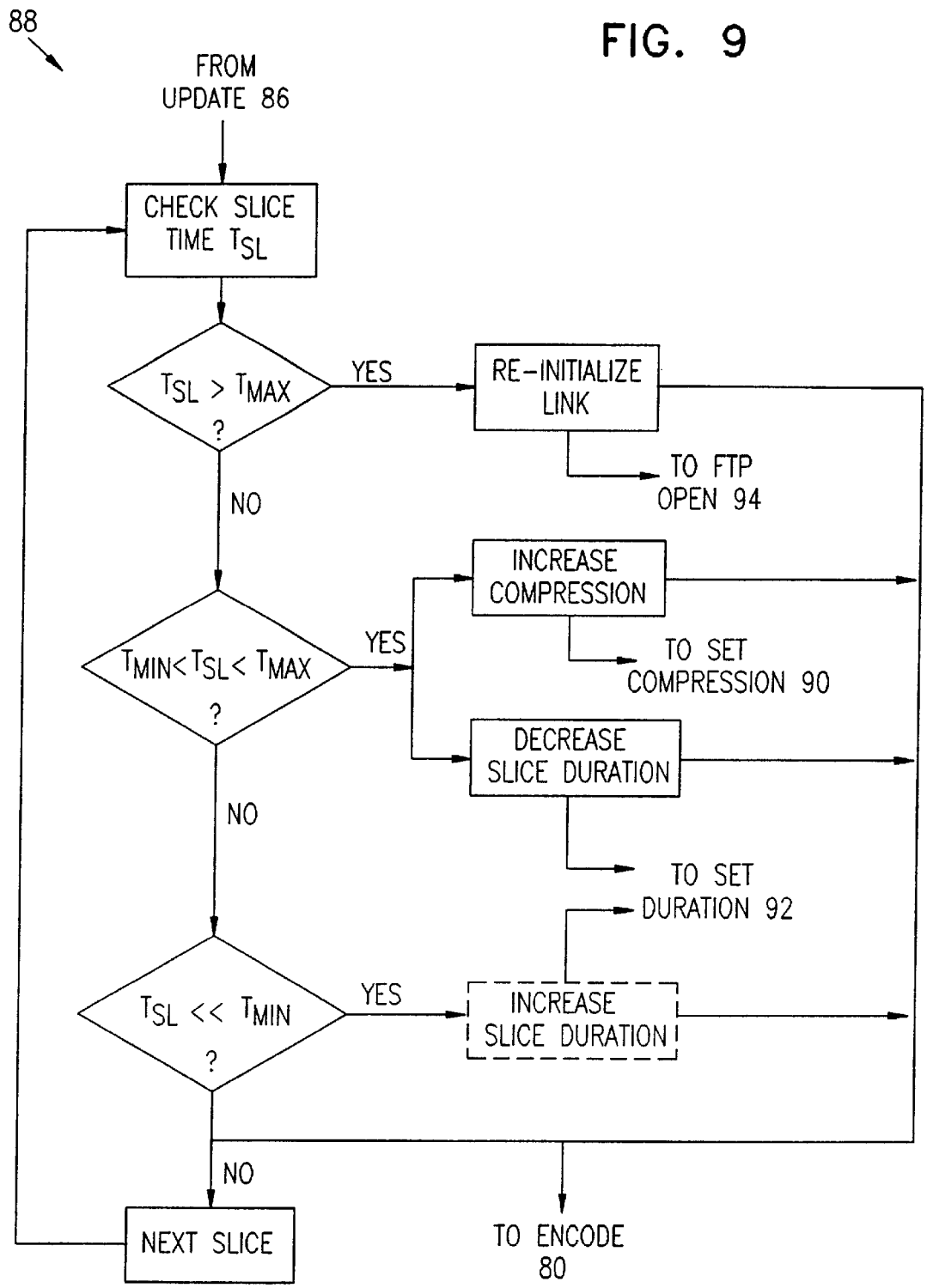

NETWORK MEDIA STREAMING

A computer printout is attached hereto as an appendix in microfiche form and is incorporated herein by reference. The printout comprises executable program files in hexadecimal format. This appendix includes 2 microfiches, containing a total of 138 frames.

FIELD OF THE INVENTION

The present invention relates generally to network data communications, and specifically to real-time multimedia broadcasting over a network.

BACKGROUND OF THE INVENTION

In network broadcasting, data are transmitted over a network in real time from a single transmitting computer to a plurality of clients simultaneously. The network may be a LAN, a WAN, an intranet or a public network such as the Internet. Network broadcasting is most commonly used to stream multimedia data, typically comprising images and sound.

FIG. 1 is a schematic illustration showing a real-time broadcasting system 20, as is known in the art. One or more input devices 22 (for example, a video camera and/or microphone) are used to generate a multimedia data stream representing an entertainment or informational program to be transmitted to a plurality of clients 30 via a network 28. Because of bandwidth limitations of the network, the data stream from host 22 must first be compressed by a real-time encoder 24 and then routed to appropriate clients 30 by a broadcast server 26 (since not all clients on the network are necessarily intended to receive the broadcast).

Encoder 24 and server 26 typically comprise high-cost, dedicated computer systems, such as a Sun Station (produced by Sun Microsystems) or a Windows NT server, running suitable RealSystem 5.0 software (produced by RealNetworks Inc., Seattle, Wash.). These dedicated systems are required in order to ensure that the data stream is distributed and received by clients 30 in real time. Similarly, host 22 must typically be connected directly to encoder 24 by a high-speed data link or LAN, and not via the Internet or other narrowband network. Therefore, real-time broadcasting is normally possible only for hosts having a suitable, dedicated encoder and broadcast server and cannot be offered by Internet service providers (ISPs) to their general clientele.

SUMMARY OF THE INVENTION

It is an object of some aspects of the present invention to provide substantially continuous, high-bandwidth data streaming over a network using common, existing server and network infrastructure.

It is a further object of some aspects of the present invention to provide data broadcasting capability, particularly for multimedia data, without the need for a dedicated broadcast computer system.

It is a further object of some aspects of the present invention to provide apparatus and methods for data broadcasting at reduced cost by comparison with systems known in the art.

It is still another object of some aspects of the present invention to enable a personal computer to remotely broadcast a multimedia program through an Internet service provider (ISP) using common, universally-supported Internet communication protocols.

In preferred embodiments of the present invention, a transmitting computer generates a data stream and broadcasts the data stream via a network server to a plurality of clients. The data stream is divided into a sequence of segments or slices of the data, preferably time slices, wherein the data are preferably compressed. Each slice is preferably assigned a respective slice index. The transmitting computer uploads the sequence of slices to the server substantially in real time, preferably using an Internet protocol, most preferably the File Transfer Protocol (FTP), as is known in the art. The clients download the data stream from the server, preferably using an Internet protocol, as well, most preferably the Hypertext Transfer Protocol (HTTP), or alternatively, using other protocols, such as UDP or RTP, which are similarly known in the art. The clients use the slice indices of the frames to maintain proper synchronization of the playback. The division of the data stream into slices and the inclusion of the slice indices in the data stream to be used by the clients in maintaining synchronization allows the broadcast to go on substantially in real time without the use of special-purpose hardware.

Preferably, each segment or slice is contained in a separate, respective file. Alternatively, the segments or slices may all be contained in a single indexed file, which is streamed to the client in a series of packets, each covering a range of one or more indices. HTTP version 1.1 supports this sort of file streaming. Other protocols may also be used for this purpose.

In some preferred embodiments of the present invention, the data stream comprises multimedia data captured or generated by the transmitting computer. The term "multimedia" as used in the context of the present patent application and in the claims refers to images or sound or to data representative of images or of sound or a combination thereof. Multimedia image data may include still images, video, graphics, animation or any combination thereof, including text displayed in conjunction therewith. It will be appreciated, however, that the principles of the present invention may similarly be applied to streaming of other data types.

Preferably, the transmitting computer compresses the frames in the data stream, most preferably using methods of image and audio compression such as those described in U.S. patent application Ser. No. 08/919,027, which is assigned to the assignee of the present patent application and incorporated herein by reference. Alternatively, any suitable methods of compression known in the art may be used. The compressed data are conveyed to the server and thence to the clients, which decompress the data.

In some preferred embodiments of the present invention, the transmitting computer and the clients monitor the uploading and downloading of data to and from the server, respectively, in order to determine the amount of time required to convey each slice and to verify that the slices are conveyed at a sufficient rate. When the data stream comprises multimedia data, the data rate should be generally equal to or faster than the rate at which the data are generated at the transmitting computer.

In some of these preferred embodiments, the transmitting computer and/or the clients each open a plurality of FTP or HTTP links, respectively, with the network server. The slices are transferred over different ones of the links in alternation. Although typically none of the plurality of links has sufficient bandwidth on its own to convey the entire data stream in real time, the combined bandwidths of the plurality of links are generally sufficient for this purpose. Preferably, each of the links is monitored to determine its specific data transfer rate. If the transfer rate of any of the links is below a predetermined minimum, that link is preferably closed, and a new link is opened in its place.

In other preferred embodiments, the slices are provided by the server at multiple resolution or quality levels. Each such level has a different degree of data compression, and thus corresponds to a different data bandwidth requirement. The client or the server monitors the data transfer rate of a data link opened therebetween and selects the level that is appropriate to the link bandwidth. If the monitored data transfer rate changes during transmission, the quality level is preferably reselected accordingly.

Preferably, the transmitting computer monitors the bandwidth of the data stream that it is uploading to the server, and compares the data stream bandwidth to a known or estimated bandwidth of the link or links between the transmitting computer and the server. The transmitting computer preferably compresses the data stream at a compression ratio that is adjusted so as to match the data stream bandwidth to the available link bandwidth, using methods described, for example, in the above-mentioned U.S. patent application Ser. No. 08/919,027.

There is therefore provided, in accordance with a preferred embodiment of the present invention, a method for real-time broadcasting from a transmitting computer to one or more client computers over a network, including:

providing at the transmitting computer a data stream having a given data rate;

dividing the stream into a sequence of slices, each slice having a predetermined data size associated therewith;

encoding the slices in a corresponding sequence of files, each file having a respective index; and uploading the sequence to a server at an upload rate generally equal to the data rate of the stream, such that the one or more client computers can download the sequence over the network from the server at a download rate generally equal to the data rate.

Preferably, dividing the stream into the sequence of slices includes dividing the stream into a sequence of time slices, each having a predetermined duration associated therewith.

Preferably, uploading the sequence includes comparing the upload rate to the data rate and adjusting the upload rate responsive to the comparison. Further preferably, encoding the stream includes compressing data in the stream at a desired compression ratio, and adjusting the upload rate includes changing the compression ratio. Alternatively or additionally, adjusting the upload rate includes adjusting the size of one or more of the slices.

Preferably, uploading the sequence includes opening a plurality of file transfer links between the transmitting computer and the server, each link characterized by a respective link data rate, and uploading different files in the sequence over different ones of the plurality of links. Further preferably, opening the plurality of links includes opening links such that the data rates of the links taken together are sufficient to upload the sequence at the upload rate generally equal to the data rate.

Preferably, uploading the sequence includes uploading a sequence using an Internet Protocol, most preferably using FTP.

Preferably, the method includes downloading the sequence using an Internet protocol, most preferably HTTP, or alternatively, UDP or RTP, over the network from the server to the one or more client computers. Preferably, the one or more client computers decode the sequence and play back the data stream responsive to the indices of the files, at a replay rate generally equal to the data rate.

Preferably, uploading the sequence includes uploading and updating an index file containing the index of the file in the sequence that was most recently uploaded, and the one or more client computers read the index file to play back the sequence. In a preferred embodiment, downloading the sequence includes selecting a file in the sequence earlier than the file whose index is contained in the index file and downloading at least a portion of the sequence of files beginning with the selected file.

Preferably, the one or more client computers include a plurality of client computers, and downloading the sequence includes downloading to the plurality of client computers substantially simultaneously.

Preferably, downloading the sequence includes opening a plurality of download links between one of the client computers and the server, each link characterized by a respective link data rate, and downloading different files in the sequence over different ones of the plurality of links. Most preferably, opening the plurality of links includes opening links such that the data rates of the links taken together are sufficient to download the sequence at the download rate generally equal to the data rate.

Preferably, opening the plurality of links includes monitoring the data rates of the links and opening a new link in place of one of the links having a data rate lower than a predetermined level.

In one preferred embodiment, opening the new link includes retransmitting at least one of the files in the sequence, wherein the at least one of the files was incompletely transmitted over the one of the links having the data rate lower than the predetermined level.

In another preferred embodiment, opening the new link includes dropping at least one file out of the sequence, wherein the at least one of the files was incompletely transmitted over the one or more of the links having the data rate lower than the predetermined level.

In still another preferred embodiment, encoding the slices includes encoding slices at a plurality of different quality levels, such that the files corresponding to a given one of the slices have a different, respective data size for each of the quality levels. Preferably, downloading the sequence includes determining a data bandwidth of the network between the server and the client computer and selecting one of the quality levels responsive to the determined bandwidth.

Preferably, the data stream includes multimedia data.

There is further provided, in accordance with a preferred embodiment of the present invention, apparatus for real-time broadcasting of a data stream having a given data rate over a network, including:

a transmitting computer, which divides the stream into a sequence of slices, each slice having a predetermined data size associated therewith, and encodes the slices in a corresponding sequence of files, each file having a respective index, and which uploads the sequence to a server at an upload rate generally equal to the data rate, such that one or more client computers can download the sequence over the network from the server at a download rate generally equal to the data rate.

Preferably, the transmitting computer compares the upload rate to the data rate and adjusts the upload rate responsive to the comparison. Most preferably, the transmitting computer compresses the data at a compression ratio which is varied responsive to the comparison. Additionally or alternatively, the transmitting computer adjusts the size of one or more of the slices responsive to the comparison.

Preferably, the transmitting computer opens a plurality of links between the transmitting computer and the server, each link characterized by a respective data rate, and transmits different ones of the sequence of files over different ones of the plurality of links. Most preferably, the transmitting computer opens the plurality of links such that the data rates of the links taken together are sufficient to upload the sequence at the upload rate generally equal to the data rate. Further preferably, the transmitting computer monitors the data rates of the links and opens a new link in place of one of the links whose data rate is lower than a predetermined level.

In a preferred embodiment, the slices are encoded at a plurality of different quality levels, such that the files corresponding to a given one of the slices have a different, respective data size for each of the quality levels.

Preferably, the transmitting computer uploads the sequence using an Internet upload protocol, most preferably FTP.

Preferably, the one or more client computers decode the sequence and play back the data stream responsive to the indices thereof, at a data replay rate generally equal to the data rate. Preferably, the one or more client computers download the encode sequence using an Internet download protocol, most preferably HTTP or alternatively, UDP or RTP.

Preferably, the one or more client computers include a plurality of client computers, which download the sequence substantially simultaneously.

Preferably, the network includes the Internet.

Further preferably, the data stream includes multimedia data, and the predetermined data size of each of the slices corresponds to a time duration of the slice.

The present invention will be more fully understood from the following detailed description of the preferred embodiments thereof, taken together with the drawings in which:

BRIEF DESCRIPTION OF THE DRAWINGS

FIG. 9 is a flow chart that schematically illustrates a method for monitoring network links, in accordance with a preferred embodiment of the present invention.

DETAILED DESCRIPTION OF PREFERRED EMBODIMENTS

Figure 2:
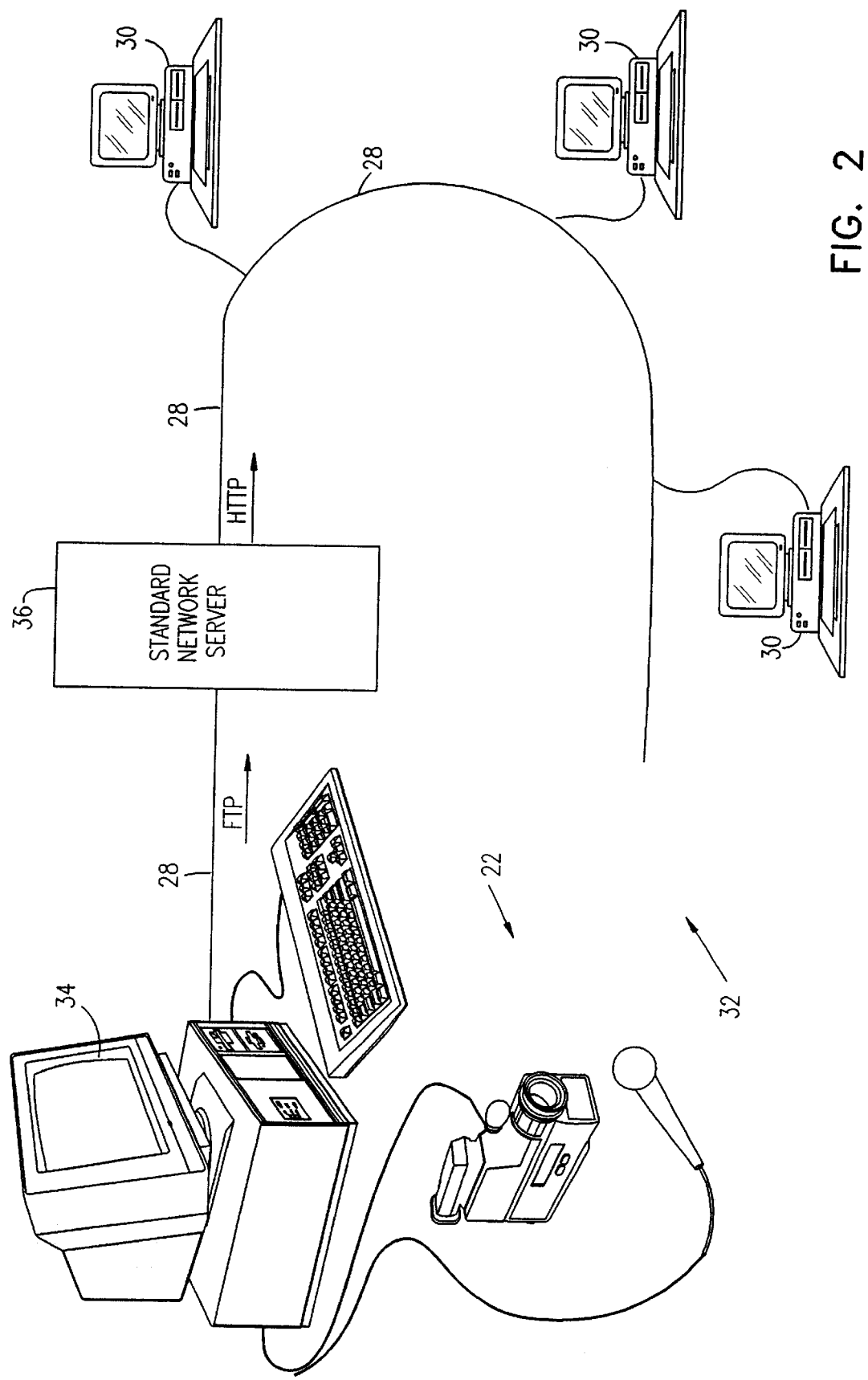
FIG. 2 is a schematic illustration of a computer broadcast network, in accordance with a preferred embodiment of the present invention.

Reference is now made to FIG. 2, which is a schematic illustration of a computer system 32 for remote broadcasting of a multimedia sequence over a network 28, in accordance with a preferred embodiment of the present invention. System 32 comprises a transmitting computer 34, which generates the sequence, a plurality of clients 30, and a network server 36, all of which communicate over network 28, preferably using the well-known Internet Protocol (IP). Computer 34 preferably receives audiovisual input from input devices 22, although data inputs of other types may be generated at or by computer 34 using any suitable means known in the art.

Figure 1:
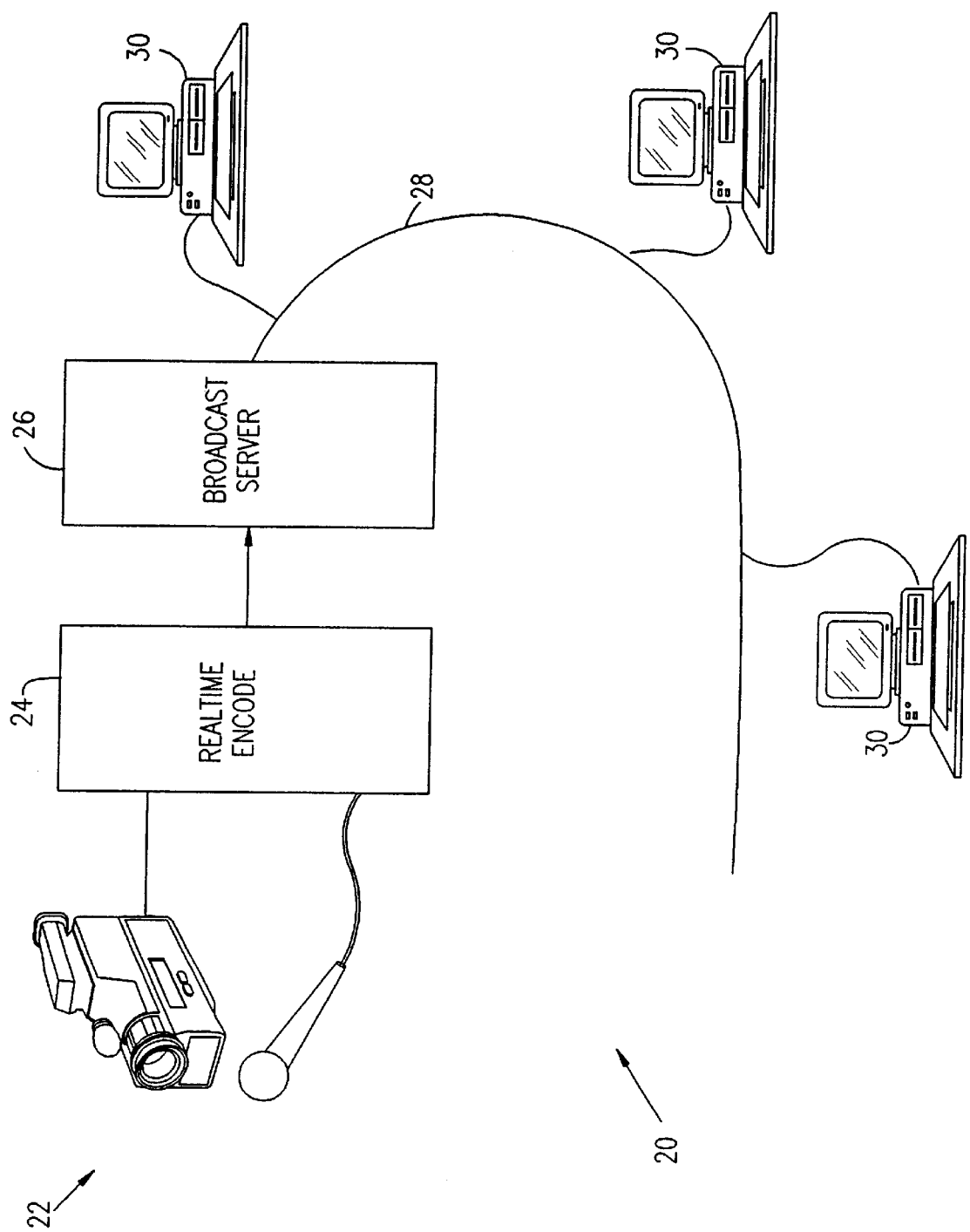
FIG. 1 is a schematic illustration of a computer broadcast network, as is known in the art.

Network 28 preferably comprises the Internet, although it may equally comprise a LAN, WAN, intranet or other computer network as is known in the art. Computer 34 and clients 30 preferably comprise conventional personal computers or workstations. Server 36 may comprise any suitable type of computer or computer system, for example, a Sun Microsystems UltraSPARC station or a Windows NT server, as are commonly used by Internet Service Providers (ISPs). In any case, it is noted that transmitting computer 34 can be remotely located relative to server 36, and that the server need not be equipped with any special-purpose hardware or software for real-time data broadcasting, unlike broadcast systems known in the art, such as the real-time encoder and broadcast server shown in FIG. 1.

After preparing the multimedia sequence, computer 34 uploads the sequence over network 28, preferably using the Internet File Transfer Protocol (FTP). Alternatively, other Internet protocols may be used, such as the TCP/IP, UDP or RT(x) protocols, which are known in the art. Preferably, the data in the sequence are compressed, although compression is not essential to implementation of the present invention. The sequence is preferably generated and compressed in real time, and could comprise, for example, an interview program or an entertainment or sports event, although a prerecorded sequence may similarly be broadcast in this manner. Computer 34 is preferably equipped with suitable software for preparing and compressing the multimedia sequence. For example, for audio data, the computer may typically run GSM 6.10 standard audio compression software, operating at a sample rate of 8 kHz, with 16 bits/sample. Some useful techniques for preparing, compressing and transmitting multimedia sequences are described in U.S. Pat. No. 5,841,432 and in the above-mentioned U.S. patent application Ser. No. 08/919,027, both of which are incorporated herein by reference.

Clients 30 connect to server 36 and receive the multimedia sequence, substantially in real time. Clients 30 preferably download the sequence using the Hypertext Transfer Protocol (HTTP), although other Internet protocols may also be used, such as UDP or RTP, as noted hereinabove with reference to uploading by computer 34. Since FTP and HTTP are supported by substantially all network servers, server 36 need not include any special-purpose broadcasting hardware or software, as noted above. Similarly, because HTTP is supported by substantially all modern Web browsers, clients 30 will typically need only add a Java applet or plug-in to their existing Web browsers, as described further hereinbelow, in order to receive and play back the broadcast.

Figure 3A:
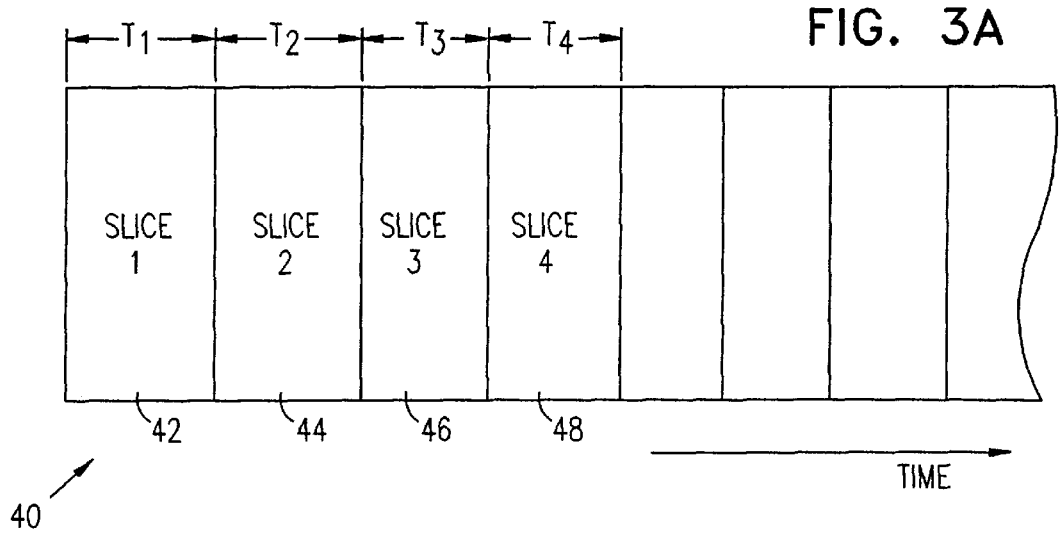
FIG. 3A is a block diagram that schematically illustrates a data structure of a broadcast sequence, in accordance with a preferred embodiment of the present invention.

FIG. 3A is a block diagram that schematically illustrates the structure of a stream of broadcast data 40 produced by computer 34, typically corresponding to a multimedia data sequence, in accordance with a preferred embodiment of the present invention. Data stream 40 comprises a series of data slices 42, 44, 46, 48, etc. Each slice contains a segment of video and/or audio data, corresponding to a respective, successive time interval labeled $T_1$, $T_2$, $T_3$, etc. The data are preferably compressed, as described further hereinbelow. Computer 34 stores each slice as a corresponding file, having a running slice index 1, 2, 3 . . . N. Preferably, each file also includes one or more time stamps, indicating a real time at which the data in the file were recorded or an elapsed time relative to the beginning of stream 40. The files are uploaded to server 36, such that while any given slice (other than first slice 42) is being created, one or more preceding slices are in the process of being uploaded.

Computer 34 monitors the time codes as file 40 is transmitted, and clients 30 similarly monitor the time codes as the file is received, in order to ensure that the transmission or reception is "keeping up" with the input of the data to the computer. In the event that a lag is detected, steps are taken to increase the data transmission or reception rate, as described further hereinbelow. For example, as shown in FIG. 3A, time intervals $T_1$, $T_2$, $T_3$, etc., are not all equal, but rather are adjusted by computer 34 in response to the transmission rate. Alternatively or additionally, the compression level of the data is varied, as is likewise described below, so as to adjust the data streaming rate to the available bandwidth over one or more channels between computer 34 and server 36, and/or between server 36 and client 30.

Computer 34 continues to upload files 42, 44, 46, etc., until data stream 40 is finished or terminated by a user of computer 34. All of the files in the data stream may be saved on server 36 for any desired period of time, as long as the server has sufficient free memory that is accessible to computer 34. Typically, however, the memory available on server 36 is limited, and files 42, 44, 46, etc., will be stored on the server and erased therefrom in a "first-in-first-out" sequence.

Figure 3B:
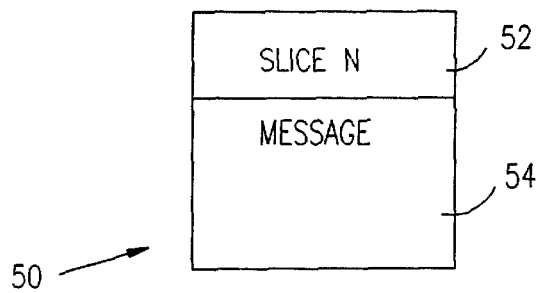
FIG. 3B is a block diagram that schematically illustrates an index file associated with the data structure of FIG. 3B, in accordance with a preferred embodiment of the present invention.

FIG. 3B is a block diagram that schematically illustrates an index file 50, which is created by computer 34, and is uploaded to server 36, in accordance with a preferred embodiment of the present invention. The index file comprises a slice ID 52, indicating the index of the file in data stream 40 that was most recently uploaded by computer 34. Each time a new file 42, 44, 46, etc., is uploaded, ID 52 in file 50 on server 36 is updated. Preferably, ID 52 holds the file name of the new file, wherein the name typically comprises a string followed by the index of the file. When one of computers 30 connects to server 36 and begins to download the data stream, it first reads the index file in order to identify at what point in stream 40 to begin and to start receiving the data stream substantially in real time, preferably with only a minimal lag, as it is transmitted from computer 34. Alternatively, a user of one of computers 30 may choose to begin downloading data stream 40 from an earlier point in time than that indicated by ID 52. Further alternatively, stream 40 may be multicast to clients 30, as is known in the art, typically without the use of an index file.

Figure 3C:
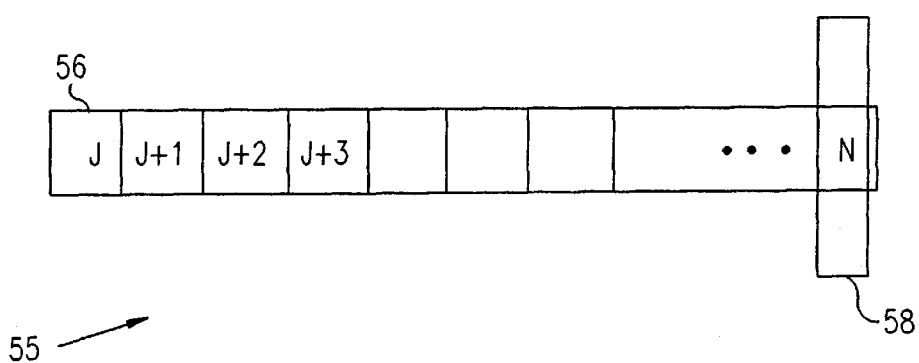
FIG. 3C is a schematic illustration of a user interface graphic, for use in conjunction with the data structure of FIG. 3A, in accordance with a preferred embodiment of the present invention.

Index file 50 may further include a message 54, which is read by computers 30 when they connect to server 36 to download data stream 40 or, alternatively or additionally, at any time the message is updated by computer 34. The message contains parameters relating generally to the data stream and/or instructions to computers 30, for example, "transmission paused." FIG. 3C is a schematic representation of a user interface graphic "slider" 55, available to users of computers 30, in accordance with a preferred embodiment of the present invention. Slider 55, which is preferably displayed on the screens of computers 30, includes a bar 56 and a movable indicator 58. The symbols J, J+1, J+2, . . . N in the figure are the indices of the slices of stream 40 that are stored on server 36, wherein N is the index of the most recent slice, and J is the index of the earliest stored slice. J may indicate the first slice in the sequence, if all of the files are stored on server 36, or it may be the earliest file not yet erased. (The indices are marked in the figure on bar 56 for clarity, and need not actually be shown on the computer screen.)

When one of computers 30 reads index file 50 and begins to download stream 40, indicator 58 preferably marks the most recent slice, as shown in FIG. 3C. This is the point at which the download will begin, unless the user of the computer chooses otherwise. If the user wishes to begin the download at an earlier point, he may move indicator 58 to the left along bar 56 to that point, preferably using a mouse or other pointing device, as is known in the art. Indicator 58 may be moved back and forth along bar 56 to jump back and forth along stream 40.

Figure 3D:
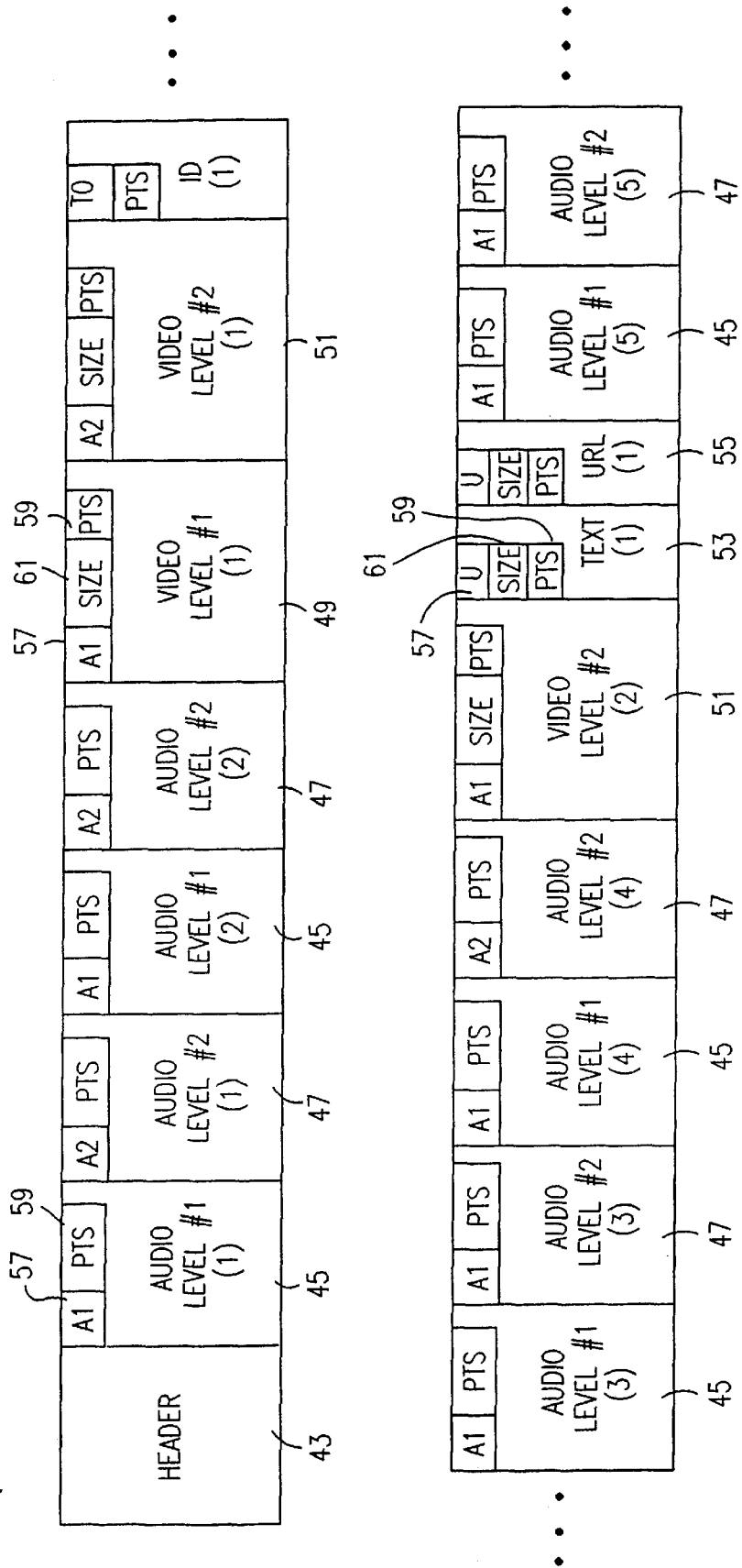
FIG. 3D is a block diagram that schematically illustrates a data structure of a broadcast sequence, in accordance with another preferred embodiment of the present invention.

FIG. 3D is a block diagram that schematically illustrates a file format of a multi-level data stream 41, in accordance with another preferred embodiment of the present invention. The data stream is divided into audio slices 45, 47 and video slices 49, 51, and may also include other data formats, such as a text slice 53 and/or a URL slice 55. Each slice is preferably identified by a level identifier 57, a presentation time stamp (PTS) index 59 and, as appropriate, a size identifier 61. The function of these identifiers and indices is described further hereinbelow. A header 43 includes data such as the title, author, copyright and formats of the data in the stream; the duration of the multimedia sequence represented by the stream; and a description of the available stream levels and associated data sizes.

Each time slice in stream 41 includes multimedia data at multiple quality levels. There are two such levels in the example shown in FIG. 3D, identified as level #1 and level #2, but a larger number of levels may also be used. Typically, the audio and video data in level #1, contained in slices 45 and 49, are more highly compressed relative to the data in slices 47 and 51 of level #2. In consequence, the level #1 slices have smaller data volume than the level #2 slices and can therefore be transmitted over a lower-bandwidth data link, while maintaining the required slice timing indicated by time stamps 59. The lower data-rate transmission generally comes at the expense of inferior sound and/or image quality. Size identifier 61 describes the size of those slices in stream 41 that have a fixed size associated therewith, wherein typically the size (or the corresponding resolution) of the level #1 video slices is smaller than that of the level #2 slices.

Each of clients 30 chooses or is assigned the quality level appropriate to the bandwidth of its link on network 28 to server 36. A method for selecting and, as required, varying the level is described hereinbelow with reference to FIG. 6B.

Figure 4:
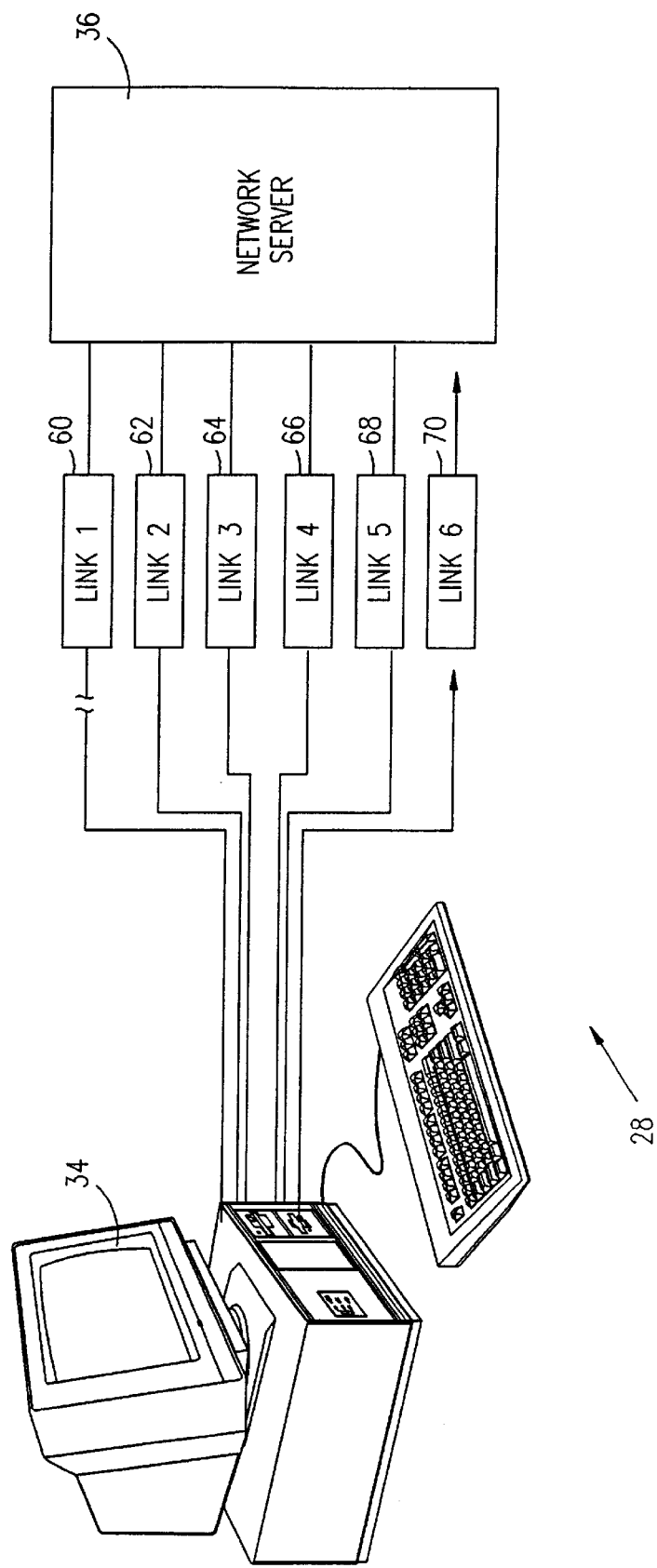
FIG. 4 is a block diagram that schematically illustrates a network connection between a transmitting computer and a network server, for use in broadcasting of a data sequence, in accordance with a preferred embodiment of the present invention.

FIG. 4 is a block diagram that schematically illustrates communication between computer 34 and server 36 over network 28, in accordance with a preferred embodiment of the present invention. Computer 34 should preferably ensure that there is sufficient communication bandwidth between the computer and the server, particularly when network 28 includes an Internet connection, which may be slow and subject to bottlenecks. For this purpose, the computer preferably opens a plurality of links, each link having its own URL (Uniform Resource Locator). Preferably, five links 60, 62, 64, 66 and 68 are opened and operate simultaneously over a single modem line. Alternatively, each link may be routed differently from the other links, over a different telephone line and/or through different Internet nodes. Files 42, 44, 46, 48, etc., in stream 40 are transmitted respectively over links 60, 62, 64, 66 and 68 in successive alternation, so that at any given time (except at the very beginning of the sequence) up to five files are transmitted in parallel. Alternatively, more than five links may be opened, so that more than five files may accordingly be transmitted in parallel.

Preferably, computer 34 monitors the rate of data being transmitted over each of links 60, 62, 64, etc., and allocates files 42, 44, 46, 48, etc., according to the data rates. The sizes of the files may be varied by adjusting slice durations $T_1, T_2, T_3$, etc., and a relatively greater volume of data may be transmitted through links exhibiting relatively greater data rates. The bandwidth open for transmission between computer 34 and server 36 is effectively roughly equal to a sum of the bandwidths of the plurality of open links. The number of links that are actually opened between computer 34 and server 36 may be less than or greater than the five links shown in the example of FIG. 4, depending on the available data rates of the open links, compared with the rate of data in stream 40. Preferably at least two links are opened, so that preparation and transmission of files 42, 44, 46, 48, etc., may be toggled back and forth between the links. A similar technique is preferably employed by clients 30.

Alternatively or additionally, the link bandwidth may be accommodated using the multi-level transmission concept illustrated by FIG. 3D, over either a single link or over multiple simultaneous links with server 36.

Figure 5:
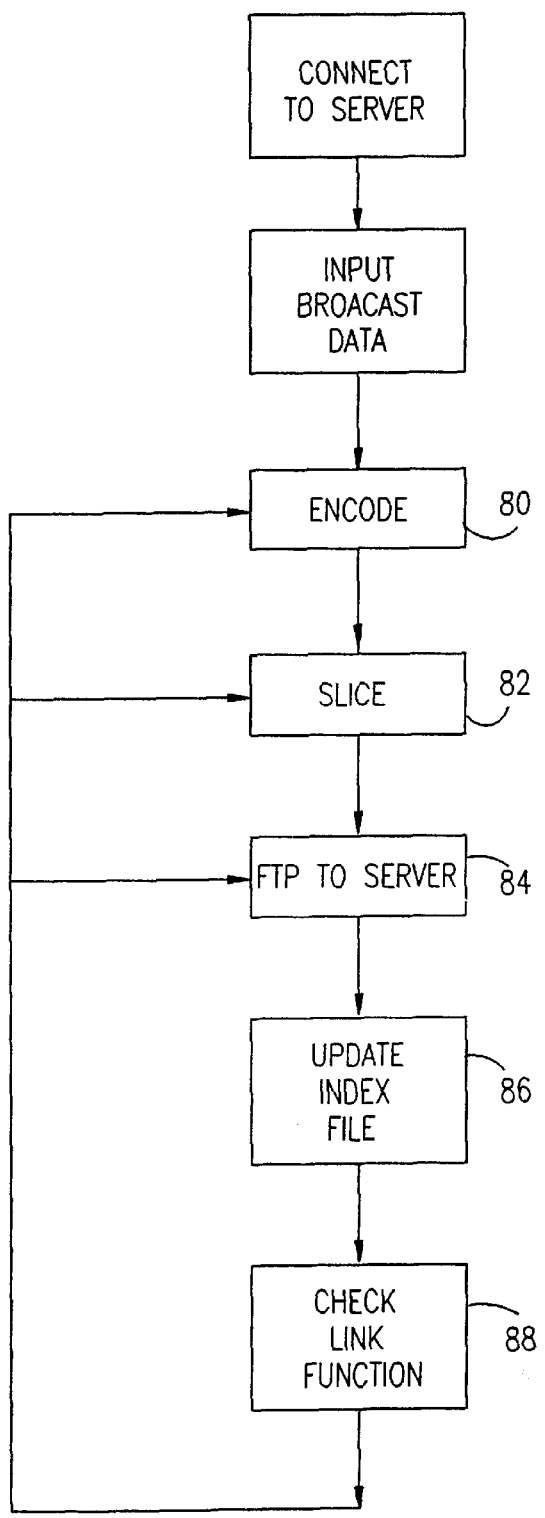
FIG. 5 is a flow chart that schematically illustrates a method of uploading broadcast data from a transmitting computer to a server, in accordance with a preferred embodiment of the present invention.
Figure 7:
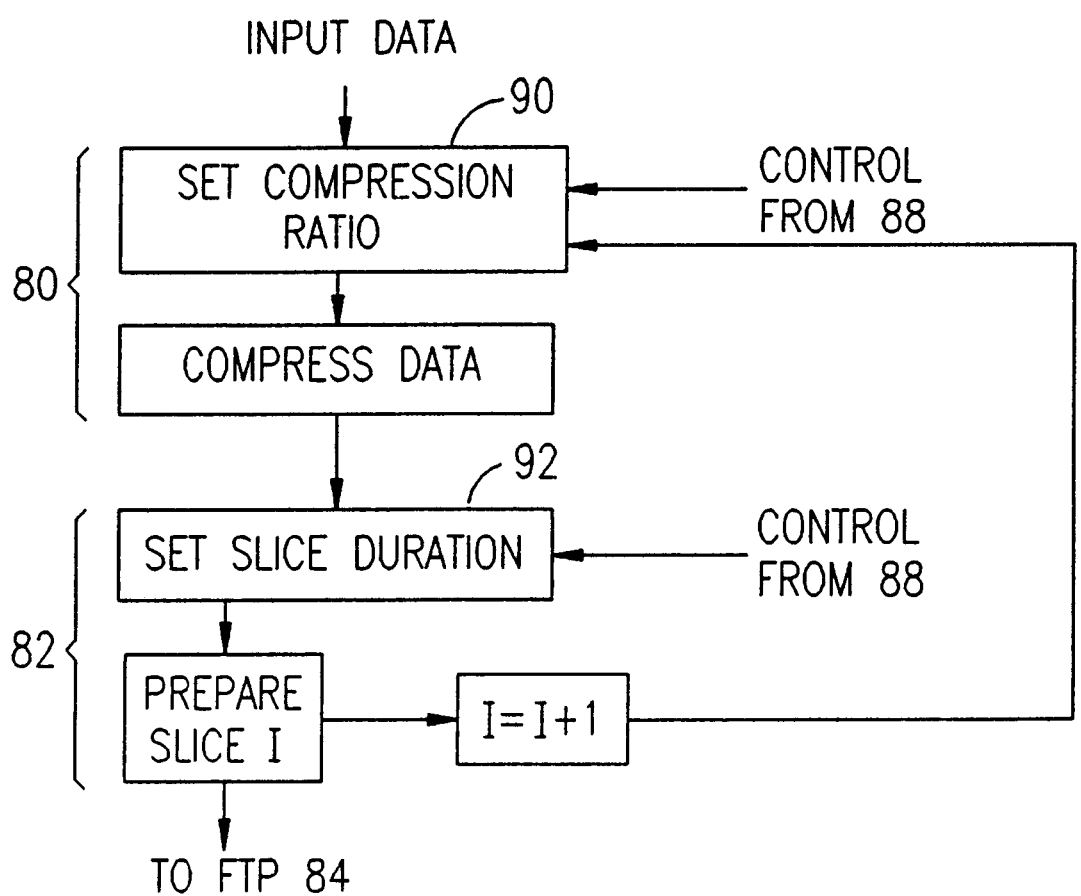
FIG. 7 is a flow chart that schematically illustrates a method for preparing data files for transmission, in accordance with a preferred embodiment of the present invention.
Figure 8:
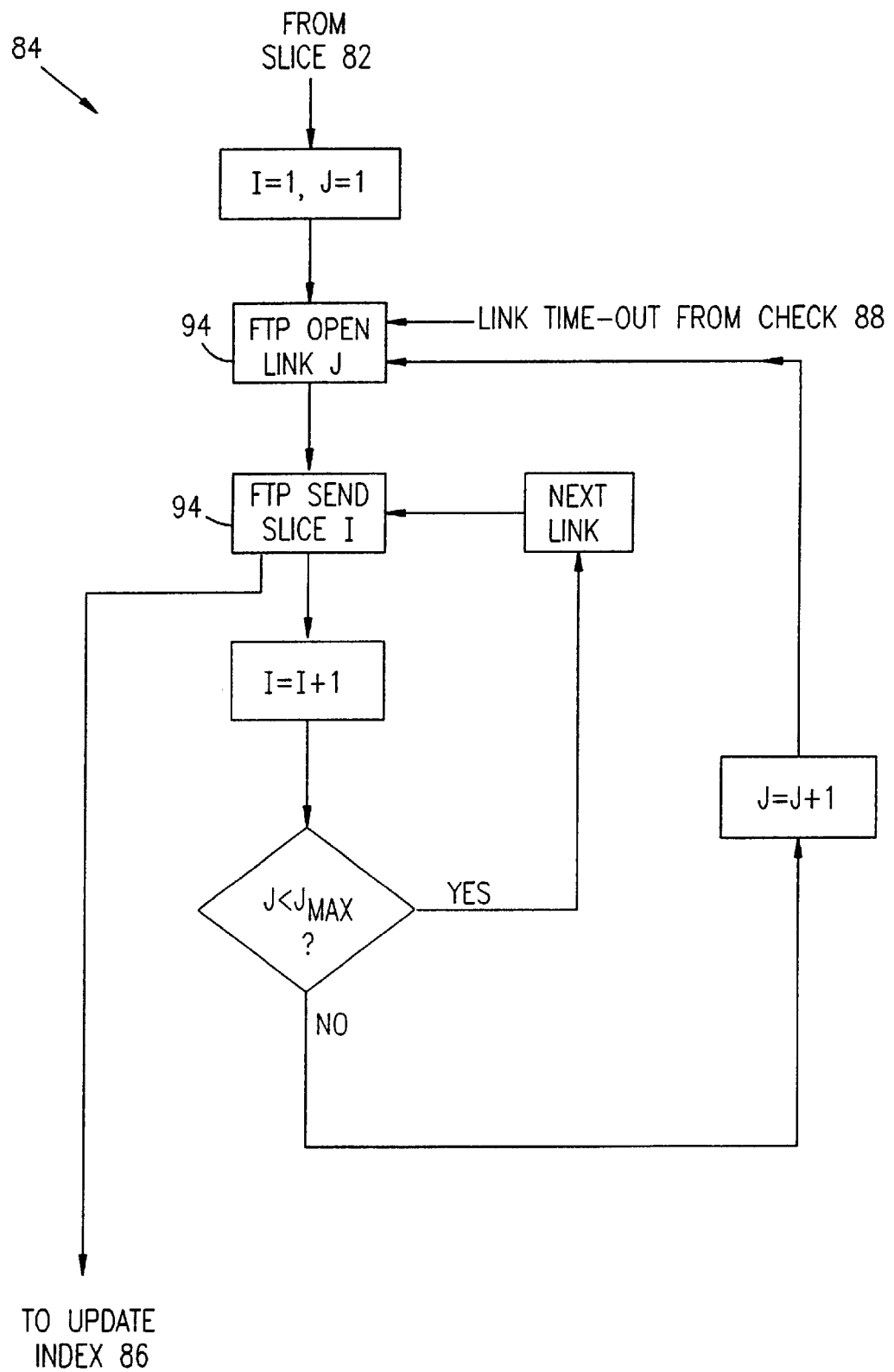
FIG. 8 is a flow chart that schematically illustrates a method of file transfer, in accordance with a preferred embodiment of the present invention.

FIG. 5 is a flow chart that schematically shows an overview of operations of computer 34 in preparing and transmitting data stream 40 over network 28, in accordance with a preferred embodiment of the present invention. Details of some of the steps in the operation are shown in FIGS. 7–9 and described further with reference thereto. Exemplary programs for carrying out the functions illustrated in FIG. 5 are incorporated herein in a software appendix, which is described further hereinbelow.

To begin the broadcast, computer 34 connects to server 36, optionally opening the plurality of links shown in FIG. 4. Broadcast data are then input to the computer, for example, from input devices 22, or from a video, audio or animation sequence stored on disk or tape. The data are compressed at step 80, and are then "sliced" at step 82 into files 42, 44, 46, 48, etc., as shown in FIG. 3A. Computer 34 conveys file 40 to server 36 over links 60, 62, 64, 66 and 68, as described above, preferably using FTP, at step 84. Each time a new file is uploaded to the server, index file 50 (FIG. 3B) is updated, at step 86.

For each of the one or more links that is open, computer 34 checks the link function at step 88, preferably by timing the transfer of the respective files being transmitted over the link. In the event that one of the links, for example, link 60 as shown in FIG. 4, is not responding or is responding unacceptably slowly, computer 34 breaks the link. The file being transmitted over the broken link may be retransmitted over another link. Alternatively, the file may be dropped from the transmission, particularly in the case of a real-time multimedia broadcast, in which data arriving at one of computers 30 will generally tend to disrupt reception of the broadcast. When link 60 is broken, a new link, for example, link 70, is opened in its stead, as described further hereinbelow with reference to FIG. 8. Alternatively or additionally, the encoding/quality level (step 80) or slicing (step 82) of the data may be adjusted, as described hereinbelow with reference to FIG. 7. This process continues until the broadcast program is completed.

Figure 6A:
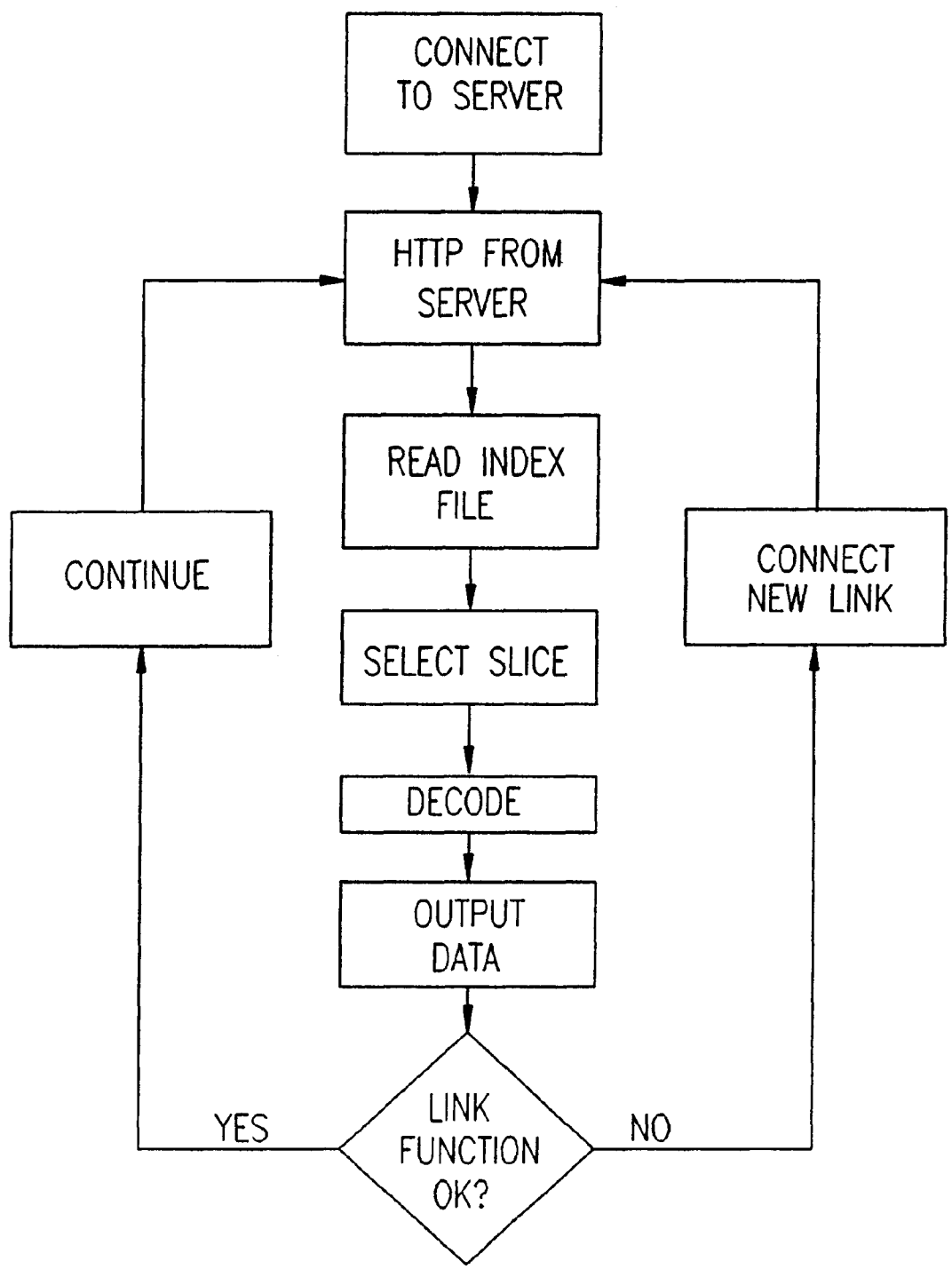
FIG. 6A is a flow chart that schematically illustrates a method of downloading broadcast data from a server to a client, in accordance with a preferred embodiment of the present invention.

FIG. 6A is a flow chart illustrating the operation of clients 30 in downloading and playing back data stream 40 (FIG. 3A) transmitted by computer 34, in accordance with a preferred embodiment of the present invention. The operation of client is controlled by a Java applet, which may be downloaded from server 36, and includes facilities for carrying out the steps shown in FIG. 6A, as well as for error detection and, optionally, correction in communications received by the clients and for other functions known in the art. A sample applet of this sort is incorporated herein in the software appendix, as further described hereinbelow.

Each client 30 connects to server 36, optionally using multiple HTTP links, in a manner similar to that shown and described above with reference to FIG. 4. Typically, client 30 opens one or two HTTP links, over which files 42, 44, 46, etc., are downloaded in successive alternation, but as in the case of transmitting computer 34, a greater number of links may similarly be opened. The client first reads index file 50 (FIG. 3B), and graphic 56 (FIG. 3C) is displayed by the client, so that a user can decide and indicate at which slice of data stream 40 to begin downloading. Responsive to a user input, client 30 selects an appropriate starting slice and begins to download and decode (decompress) files 42, 44, 46, etc. In the case of a multimedia stream, client 30 reconstructs and outputs the multimedia data for the appreciation of a user. Time stamps in the data stream are used to synchronize the data, so that the multimedia sequence is played back just as it was input at computer 34, preferably with only a minimal necessary transmission and decoding delay.

Client 30 preferably monitors the rate of data coming in over each of its links with server 36. If any of the links is non-operative or is operating unacceptably slowly, that link is closed, and a new link is opened in its place, as described above. Further preferably, the client compares the times stamped in the data stream to a local real-time clock and, if it determines that there is a significant lag in the time codes relative to the real-time clock, opens additional links with server 36 in order to increase the overall data rate.

Figure 6B:
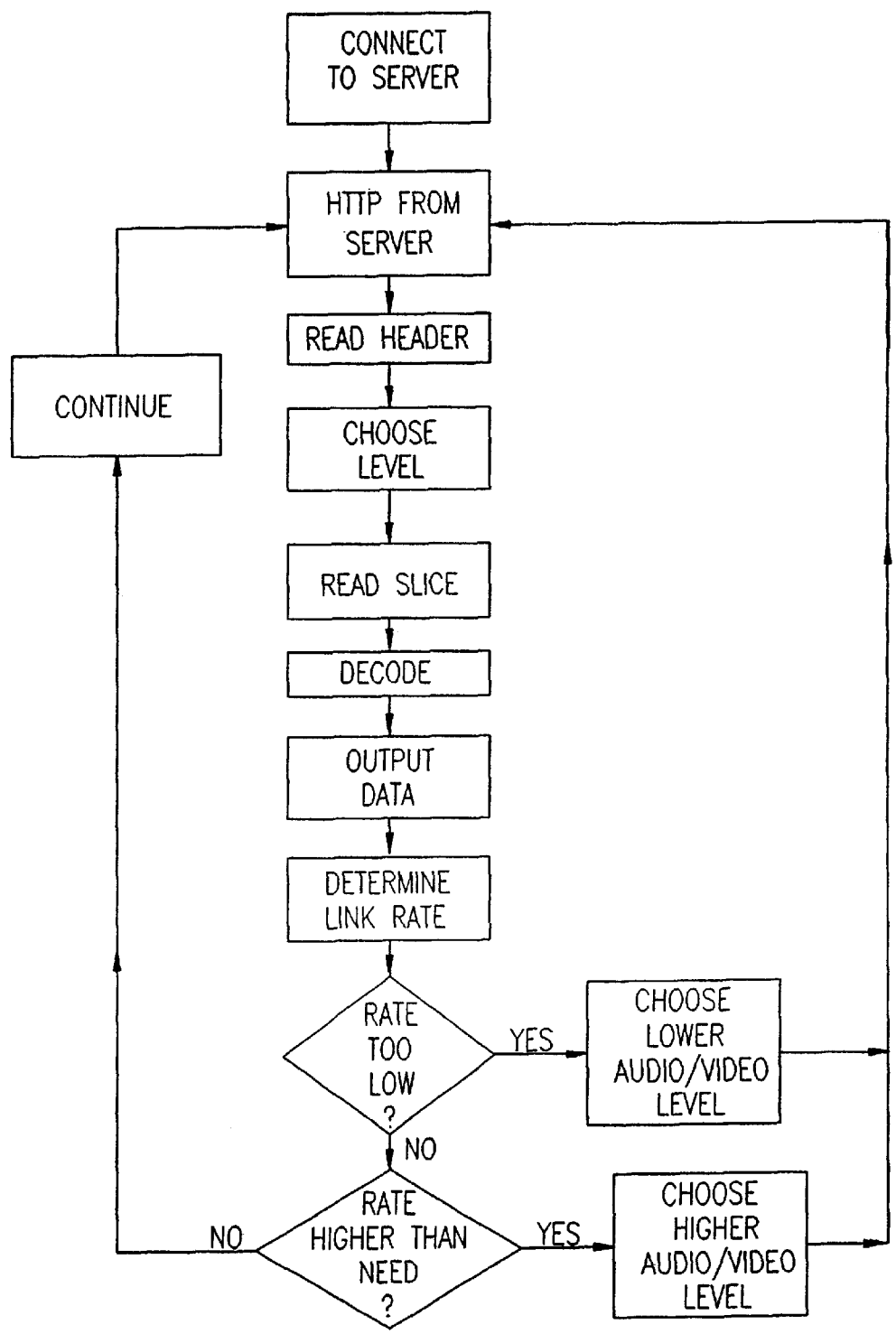
FIG. 6B is a flow chart that schematically illustrates a method of downloading broadcast data from a server to a client, in accordance with another preferred embodiment of the present invention.

FIG. 6B is a flow chart illustrating the operation of clients 30 in downloading and playing back multi-level data stream 41 (FIG. 3D) transmitted from server 36, in accordance with another preferred embodiment of the present invention. As in the method of FIG. 6A, each client 30 connects to the server, generally using a single HTTP link. After reading header 43 and, preferably, making an initial assessment of the link bandwidth, the client selects one of the available quality levels in the stream. Responsive to the selection, server 36 begins to transmit data slices at the chosen quality level. The slices are received, decoded and output by the client.

Periodically, client 30 makes an assessment of the rate of data transfer over the link from the server and, if necessary, changes the quality level accordingly. For example, if the rate is low, such that time stamps 59 indicate that the slices need to be played as fast as or faster than they are being received, the client will preferably select a lower quality level if one is available. On the other hand, if the rate is substantially higher than what is needed to receive the successive slices on time, the client may select a higher quality level to take advantage of the available bandwidth. Preferably, upper and lower data rate thresholds, or watermarks, are set dynamically in response to the data rate and are used in determining when a new quality level should be selected.

FIG. 7 is a flow chart that schematically illustrates details of encoding step 80 and slicing step 82 in the method of FIG. 5, in accordance with a preferred embodiment of the present invention. In encoding data stream 40, computer 34 preferably compresses the data using any suitable compression method known in the art. For example, if data stream 40 comprises audio data, GSM 6.10 standard encoding may be used, as is known in the art, to compress the data by about 10:1. Alternatively or additionally, for video data, H.263 standard compression, similarly known in the art, may be used. These compression standards are advantageous in that common personal computers can perform such compression in real time, in parallel with the other operations illustrated in FIG. 5. Other compression methods known in the art, such as MPEG data compression, may similarly be used, as long as computer 34 is sufficiently powerful.

Computer 34 determines a compression ratio by which to compress the data, based on the collective bandwidth of its open links with server 36. Preferably, computer 34 receives an indication of the bandwidths of the links, determined at step 88 in FIG. 5, and adjusts the compression ratio accordingly, at a set compression step 90. For example, the compression ratio may be adjusted by changing compression coefficients (e.g., MPEG coefficients) so as to match the data stream bandwidth to the available link bandwidth. Methods of adaptively varying the compression ratio of a multimedia data stream that can be used for this purpose are described, for example, in the above-mentioned U.S. patent application Ser. No. 08/919,027.

Similarly, at a set duration step 92, slice durations $T_1$, $T_2$, $T_3$, etc., are optionally adjusted responsive to the link bandwidths. Initially, duration $T_1$ of slice 1 for file 42 is set to a default value, typically between 1 and 5 sec. For example, to transfer compressed audio data at 2 Kbytes/sec, file 42 may be assigned a file size of 10 Kbytes, with $T_1=5$ sec. Assuming that computer 34 communicates over network 28 through a 28.8 Kbaud modem and maintains a typical FTP upload rate of 2 Kbytes/sec (allowing for moderate Internet bottlenecks), data stream 40 will be uploaded to server 36 over link 60 (FIG. 4) substantially at the rate that the audio data are input to computer 34.

Frequently, however, this will not be the case, and the FTP upload rate over link 60 will fluctuate and may be slower than 2 Kbyte/sec. At step 88 (FIG. 5), the time required to upload file 42 is measured and compared to $T_1$, at the same time as file 44 (slice 2) is being encoded and prepared. Responsive to this measurement of upload time, the duration of subsequent slices, for example, times $T_3$ and $T_4$ for files 46 and 48, respectively, is adjusted. Thus, as illustrated in FIG. 3A, $T_3$ and $T_4$ are less than $T_1$ and $T_2$. The shorter files 46, 48, etc., that result from the change in slice duration are more likely to reach server 36 in the proper sequence, without being held up by extended bottlenecks. Furthermore, when the slice durations are shorter, the effect of "drop-out" of a slice due to failure of the corresponding link is less marked.

On the other hand, if it is determined that the upload time for file 42 (or a subsequent file) is substantially shorter than duration $T_1$, the duration of subsequent files may be extended, and/or the compression ratio may be decreased, so as to take better advantage of the available bandwidth.

FIG. 8 is a flow chart that schematically illustrates details of FTP step 84 in the method shown in FIG. 5, in accordance with a preferred embodiment of the present invention. To begin the process of FTP transfer to server 36, a FTP OPEN command is issued to the server by computer 34 at step 94, thus opening link 60 (FIG. 4). The computer then issues a FTP SEND command to send file 42, corresponding to slice 1, over the link. These steps are repeated for each of a first group of links 62, 64, 66 and 68 and for a corresponding first group of files 44, 46, 48, etc., up to a maximum initial number of links $J_{MAX}$. In the current example, $J_{MAX}=5$, since the inventors have found that five FTP links provide a reliable upload path with a sufficient overall bandwidth when transferring data over the Internet. A larger or smaller number of links could be used, however, and $J_{MAX}$ may also be assigned the value 1, in which case the steps of the method of FIG. 5, and the details thereof shown in FIGS. 7, 8 and 9, are carried out over a single FTF link.

As described above, links 60, 62, 64, 66 and 68 continue to operate until and unless it is determined that one of the links (for example, link 60 in FIG. 4) is operating at an unacceptably slow data transfer rate. Assuming all of the links to be functioning properly, after the first five slices of stream 40 have been allocated in succession to the five links, a file corresponding to a sixth slice of the stream is then allocated again to link 60, or to whichever of the open links was the first to have completed transmission of its initial file. This process continues in alternation for all of the slices of stream 40, until transmission is completed.

If link 60 has not completed transmission of file 42 by the time the sixth file is ready for transmission, link 60 will have timed out, and a time-out indication will be received from step 88 (FIG. 5). In this case, link 60 is terminated and is replaced by link 70. Preferably, a "socket" opened for link 60 by a WINSOCK program running on computer 34 is simply reinitialized to open link 70. Optionally, file 42 is retransmitted over link 70 or over one of the other links, although in the case of a live broadcast transmission, it may be preferable simply to drop the file rather than send it after such a long delay.

FIG. 9 is a flow chart that schematically illustrates details of check link step 88 in the method of FIG. 5, in accordance with a preferred embodiment of the present invention. As noted above, for each file 42, 44, 46, etc., computer 34 measures a slice transmission time $T_{SL}$, corresponding to the time required to transmit the entire file to server 36. If $T_{SL}$ is greater than a maximum permissible time $T_{MAX}$, it is then determined that the link over which the file was transmitted is not functioning adequately. In this case, a command is sent to open a new FTP link at step 94, as described above. $T_{MAX}$ is preferably set to be a predetermined multiple of $T_{SL}$, depending on the length of possible transmission delay that can be tolerated. Typically, $T_{MAX}$ is set to an initial value of about 20 sec, although when the slice durations are changed (at step 92), $T_{MAX}$ is preferably adjusted accordingly.

For optimal, reliable functioning of the upload process from computer 34 to server 36, $T_{SL}$ should desirably be close to or less than a predetermined minimum time $T_{MIN}$. Typically, $T_{MIN}$ is set to be approximately equal to the slice duration $T_1$, $T_2$, etc., i.e., about 5 sec initially. If the measured value of $T_{SL}$ is greater than $T_{MIN}$, although still less than $T_{MAX}$, then it will generally be desirable to either increase the compression ratio, at step 90, or decrease the slice duration, at step 92, or both. The reasons and methods for changing the compression ratio and slice duration were described hereinabove with reference to FIG. 7. Preferably, computer 34 calculates optimal values of the compression ratio and slice duration, depending inter alia on the relative values of $T_{SL}$ and $T_{MIN}$.

If $T_{SL}$ is substantially less than $T_{MIN}$, then the slice duration may optionally be increased, as noted hereinabove.

The process shown in FIG. 5, including the interdependent steps of encoding 80, slicing 82, FTP upload 84, updating 86 and checking link function 88 thus continues until the entire data stream 40 is uploaded (except for any of files 42, 44, 46, 48, etc., that may be dropped due to excessive transmission delay, as described above), or until the transfer is terminated by a user of computer 34. Although details of these steps have been described primarily with reference to the uploading process of FIG. 5, it will be understood that similar methods are applicable, mutatis mutandis, to the method of downloading the files from server 36 to clients 30, as shown in FIG. 6A.

Although the preferred embodiments described hereinabove refer primarily to broadcasting multimedia data over the Internet, in other preferred embodiments of the present invention, network 28 may comprise substantially any suitable sort of network, such as a LAN, WAN or intranet, and the data may comprise substantially any type of continuously streaming data. It will be understood in this case that the slices of the data stream corresponding to files 42, 44, 46, etc., will not necessarily be time slices as described hereinabove, but may rather have an appropriate, preferably variable, data size associated therewith. Furthermore, it will be appreciated that the principles of the present invention may similarly be applied in other areas of real-time multimedia data streaming, such as video teleconferencing.

It will thus be understood that the preferred embodiments described above are cited by way of example, and the full scope of the invention is limited only by the claims.

Software Appendix

An appendix is attached hereto as an integral part of the present patent application, including the following computer-readable files, which exemplify aspects of the operation of system 32 (FIG. 2) and of the file structures and methods described hereinabove. This appendix contains material covered by copyright, belonging to Geo Interactive Media Group Ltd.:

1. LiveFeedClient.exe
2. LFRec.dll
3. Jsdec.class
4. EmblazeAudio.class
5. CyclicDecoderStream.class
6. RandomAccessStream.class
7. Xbuttons.jpg
8. ALF.HTML
9. Addresses.dat The above files should be entered into a personal computer, preferably a desktop PC (Pentium 166 MHz, with 32 MB RAM), with a Windows 95 or Windows NT operating system installed. The files should be stored on disk in a common folder or directory, together with a Microsoft Basic DLL file named Msvbvm50.dll, available from Microsoft Inc., Redmond, Wash. The computer should be equipped with a Sound Blaster sound card, with a microphone connected to the line-in input jack thereon. The computer should also be connected to the Internet via a standard modem or LAN, and should have an FTP account with an Internet Service Provider (ISP).

What is claimed is:

1. A method for real-time broadcasting from a transmitting computer to one or more client computers over a network, comprising:

providing at the transmitting computer a data stream having a given data rate;

dividing the stream into a sequence of slices, each slice having a predetermined data size associated therewith;

encoding the slices in a corresponding sequence of files, each file having a respective index; and uploading the sequence to a server at an upload rate generally equal to the data rate of the stream, such that the one or more client computers can download the sequence over the network from the server at a download rate generally equal to the data rate.

2. A method according to claim 1, and comprising downloading the sequence using an Internet protocol over the network from the server to the one or more client computers.

3. A method according to claim 2, wherein downloading the sequence comprises opening a plurality of download links between one of the client computers and the server, each link characterized by a respective link data rate, and downloading different files in the sequence over different ones of the plurality of links.

4. A method according to claim 3, wherein opening the plurality of links comprises monitoring the data rates of the links and opening a new link in place of one of the links having a data rate lower than a predetermined level.

5. A method according to claim 4, wherein opening the new link comprises retransmitting at least one of the files in the sequence, wherein the at least one of the files was incompletely transmitted over the one of the links having the data rate lower than the predetermined level.

6. A method according to claim 4, wherein opening the new link comprises dropping at least one file out of the sequence, wherein the at least one of the files was incompletely transmitted over the one or more of the links having the data rate lower than the predetermined level.

7. A method according to claim 3, wherein opening the plurality of links comprises opening links such that the data rates of the links taken together are sufficient to download the sequence at the download rate generally equal to the data rate.

8. A method according to claim 2, wherein the one or more client computers decode the sequence and play back the data stream responsive to the indices of the files, at a replay rate generally equal to the data rate.

9. A method according to claim 8, wherein uploading the sequence comprises uploading and updating an index file containing the index of the file in the sequence that was most recently uploaded, and wherein the one or more client computers read the index file to play back the sequence.

10. A method according to claim 9, wherein downloading the sequence comprises selecting a file in the sequence earlier than the file whose index is contained in the index file and downloading at least a portion of the encoded sequence of files beginning with the selected file.

11. A method according to claim 2, wherein encoding the slices comprises encoding slices at a plurality of different quality levels, such that the files corresponding to a given one of the slices have a different, respective data size for each of the quality levels.

12. A method according to claim 11, wherein downloading the sequence comprises determining a data bandwidth of the network between the server and the client computer and selecting one of the quality levels responsive to the determined bandwidth.

13. A method according to claim 2, wherein downloading the sequence comprises downloading the sequence using a protocol selected from a group consisting of HTTP, UDP and RTP.

14. A method according to claim 2, wherein the one or more client computers comprise a plurality of client computers, and wherein downloading the sequence comprises downloading to the plurality of client computers substantially simultaneously.

15. A method according to claim 1, wherein uploading the sequence comprises comparing the upload rate to the data rate and adjusting the upload rate responsive to the comparison.

16. A method according to claim 15, wherein encoding the stream comprises compressing data in the stream at a desired compression ratio, and wherein adjusting the upload rate comprises changing the compression ratio.

17. A method according to claim 15, wherein adjusting the upload rate comprises adjusting the size of one or more of the slices.

18. A method according to claim 1, wherein uploading the sequence comprises opening a plurality of file transfer links between the transmitting computer and the server, each link characterized by a respective link data rate, and uploading different files in the sequence over different ones of the plurality of links.

19. A method according to claim 18, wherein opening the plurality of links comprises opening links such that the data rates of the links taken together are sufficient to upload the sequence at the upload rate generally equal to the data rate.

20. A method according to claim 18, wherein opening the plurality of links comprises monitoring the data rates of the links and opening a new link in place of one of the links having a data rate lower than a predetermined level.

21. A method according to claim 1, wherein uploading the sequence comprises uploading a sequence using an Internet Protocol.

22. A method according to claim 21, wherein uploading the sequence comprises uploading a sequence using FTP.

23. A method according to claim 1, wherein dividing the stream into the sequence of slices comprises dividing the stream into a sequence of time slices, each having a predetermined duration associated therewith.

24. A method according to claim 1, wherein the data stream comprises multimedia data.

25. Apparatus for real-time broadcasting of a data stream having a given data rate over a network, comprising:

a transmitting computer, which divides the stream into a sequence of slices, each slice having a predetermined data size associated therewith, and encodes the slices in a corresponding sequence of files, each file having a respective index, and which uploads the sequence to a server at an upload rate generally equal to the data rate, such that one or more client computers can download the sequence over the network from the server at a download rate generally equal to the data rate.

26. Apparatus according to claim 25, wherein the one or more client computers decode the sequence and play back the data stream responsive to the indices thereof, at a data replay rate generally equal to the data rate.

27. Apparatus according to claim 26, wherein the one or more client computers download the sequence using an Internet download protocol.

28. Apparatus according to claim 27, wherein the Internet download protocol is selected from a group consisting of HTTP,UDP and RTP.

29. Apparatus according to claim 26, wherein the one or more client computers comprise a plurality of client computers, which download the sequence substantially simultaneously.

30. Apparatus according to claim 25, wherein the transmitting computer compares the upload rate to the data rate and adjusts the upload rate responsive to the comparison.

31. Apparatus according to claim 30, wherein the transmitting computer compresses the data at a compression ratio which is varied responsive to the comparison.

32. Apparatus according to claim 30, wherein the transmitting computer adjusts the size of one or more of the slices responsive to the comparison.

33. Apparatus according to claim 25, wherein the transmitting computer opens a plurality of links between the transmitting computer and the server, each link characterized by a respective data rate, and transmits different ones of the sequence of files over different ones of the plurality of links.

34. Apparatus according to claim 33, wherein the transmitting computer opens the plurality of links such that the data rates of the links taken together are sufficient to upload the sequence at the upload rate generally equal to the data rate.

35. Apparatus according to claim 33, wherein the transmitting computer monitors the data rates of the links and opens a new link in place of one of the links whose data rate is lower than a predetermined level.

36. Apparatus according to claim 25, wherein the data stream comprises multimedia data.

37. Apparatus according to claim 36, wherein the predetermined data size of each of the slices corresponds to a time duration of the slice.

38. Apparatus according to claim 25, wherein the transmitting computer uploads the encoded sequence using an Internet upload protocol.

39. Apparatus according to claim 38, wherein the Internet upload protocol comprises FTP.

40. Apparatus according to claim 25, wherein the slices are encoded at a plurality of different quality levels, such that the files corresponding to a given one of the slices have a different, respective data size for each of the quality levels.

41. Apparatus according to claim 25, wherein the network comprises the Internet.

\* \* \* \* \*

UNITED STATES PATENT AND TRADEMARK OFFICE
CERTIFICATE OF CORRECTION

PATENT NO.     : 6,389,473 B1
DATED          : May 14, 2002
INVENTOR(S)    : Sharon Carmel et al.

It is certified that error appears in the above-identified patent and that said Letters Patent is hereby corrected as shown below:

<u>Title page,</u>
Item [75], "Ginsberg" should read -- Ginzberg --.

Signed and Sealed this

Ninth Day of July, 2002

*Attest:*

*Attesting Officer*

JAMES E. ROGAN
*Director of the United States Patent and Trademark Office*